(12) United States Patent
Stephens

(10) Patent No.: US 9,184,944 B2
(45) Date of Patent: Nov. 10, 2015

(54) INTERFACE CONTROL

(75) Inventor: Richard Martin Stephens, Godalming (GB)

(73) Assignee: Nokia Technologies Oy, Espoo (FI)

( * ) Notice: Subject to any disclaimer, the term of this patent is extended or adjusted under 35 U.S.C. 154(b) by 438 days.

(21) Appl. No.: 13/146,516

(22) PCT Filed: Dec. 2, 2009

(86) PCT No.: PCT/EP2009/066263
§ 371 (c)(1),
(2), (4) Date: Sep. 30, 2011

(87) PCT Pub. No.: WO2010/086052
PCT Pub. Date: Aug. 5, 2010

(65) Prior Publication Data
US 2012/0013311 A1  Jan. 19, 2012

(30) Foreign Application Priority Data
Jan. 27, 2009 (GB) .................................. 0901271.7

(51) Int. Cl.
*G06F 13/42* (2006.01)
*H03K 5/12* (2006.01)
*H04L 25/02* (2006.01)
*H04W 80/02* (2009.01)

(52) U.S. Cl.
CPC ............ *H04L 25/0286* (2013.01); *G06F 13/42* (2013.01); *H04W 80/02* (2013.01)

(58) Field of Classification Search
CPC .............................. G06F 13/00; H04B 5/0037
USPC ....................................................... 710/106
See application file for complete search history.

(56) References Cited

U.S. PATENT DOCUMENTS

| 5,801,352 | A | * | 9/1998 | Taneda et al. | 219/69.18 |
| 5,982,760 | A | * | 11/1999 | Chen | 370/335 |
| 6,005,890 | A | * | 12/1999 | Clow et al. | 375/221 |
| 6,122,135 | A | * | 9/2000 | Stich | 360/78.09 |
| 6,163,211 | A | * | 12/2000 | Morrish | 330/98 |
| 6,198,322 | B1 | * | 3/2001 | Yoshimura | 327/175 |
| 6,870,390 | B1 | * | 3/2005 | Groen et al. | 326/27 |
| 6,909,308 | B2 | * | 6/2005 | Hunt | 326/87 |
| 7,038,512 | B2 | * | 5/2006 | Wilson et al. | 327/170 |
| 7,312,662 | B1 | * | 12/2007 | Roo | H03F 3/265 330/253 |
| 7,321,662 | B2 | * | 1/2008 | Lundh et al. | 381/314 |
| 7,489,158 | B2 | * | 2/2009 | Weston et al. | 326/26 |
| 2004/0090253 | A1 | * | 5/2004 | McNitt et al. | 327/170 |
| 2008/0191766 | A1 | | 8/2008 | Azimi et al. | |

OTHER PUBLICATIONS

International Search Report for Application No. PCT/Ep2009/066263 dated Jun. 4, 2010.

* cited by examiner

*Primary Examiner* — Titus Wong
(74) *Attorney, Agent, or Firm* — Alston & Bird LLP

(57) ABSTRACT

An apparatus, method and computer program, the apparatus comprising: communication circuitry configured to drive, on a first occasion, a first transition of a first electrical parameter on an electrical interface to another apparatus; determination circuitry configured to determine feedback information dependent upon a measured electrical parameter on the electrical interface; and control circuitry configured to use the determined feedback information to control the power output of the communication circuitry to achieve, on a second occasion subsequent to the first occasion, the first transition of the first electrical parameter on the electrical interface within a threshold time period.

18 Claims, 6 Drawing Sheets

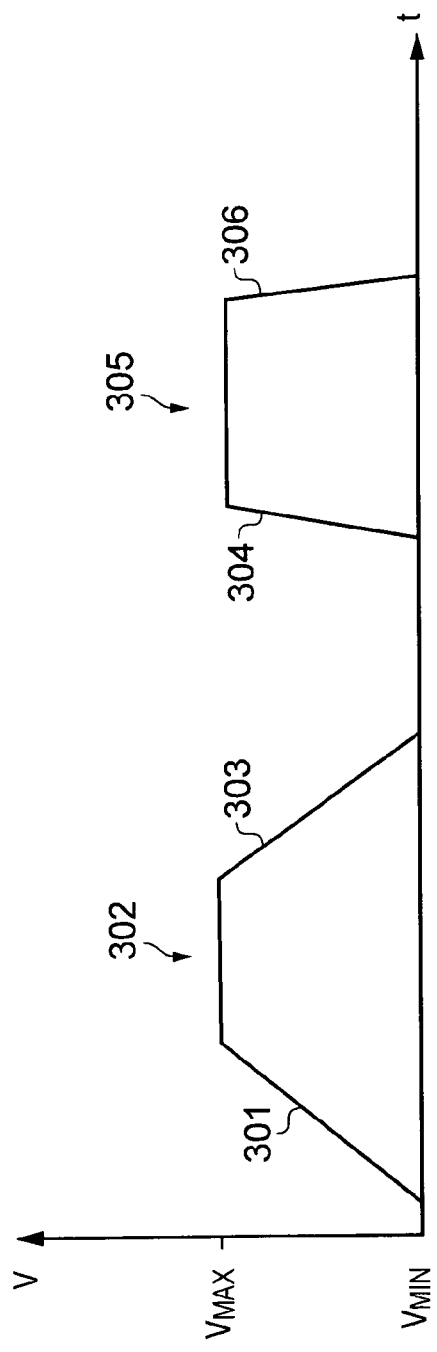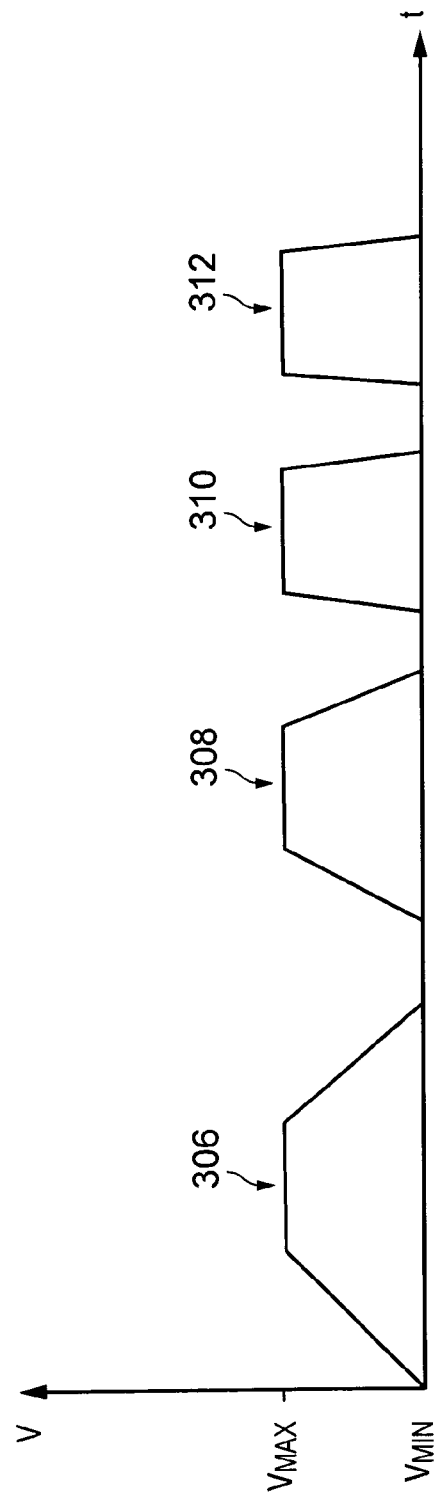

INTERFACE CONTROL

FIELD OF THE INVENTION

Embodiments of the present invention relate to interface control. In particular, they relate to controlling current transitions on an electrical interface.

BACKGROUND TO THE INVENTION

A first electronic apparatus may be connected to second electronic apparatus by an electrical interface. The first electronic apparatus may communicate information to the second electronic apparatus by driving current transitions on the electrical interface. The information may, for example, be a clock signal, a control signal or data.

BRIEF DESCRIPTION OF VARIOUS EMBODIMENTS OF THE INVENTION

According to various, but not necessarily all, embodiments of the invention there is provided an apparatus, comprising: communication circuitry configured to drive, on a first occasion, a first transition of a first electrical parameter on an electrical interface to another apparatus; determination circuitry configured to determine feedback information dependent upon a measured electrical parameter on the electrical interface; and control circuitry configured to use the determined feedback information to control the power output of the communication circuitry to achieve, on a second occasion subsequent to the first occasion, the first transition of the first electrical parameter on the electrical interface within a threshold time period.

The first electrical parameter may be current or voltage. The measured electrical parameter may be current or voltage.

The feedback information may be dependent upon a property of the another apparatus. The property may relate to the physical characteristics of the another apparatus.

The feedback information may relate to a change of a voltage on the electrical interface. The change in voltage may occur during the first transition. The change of the voltage may be estimated to be linear.

The determined feedback information may indicate a time period over which a voltage on the electrical interface changed from a first voltage level to a second voltage level. The determination circuitry may comprise oscillation circuitry configured to determine a time period. The oscillation circuitry may be configured to generate pulses when the voltage on the electrical interface is between the first voltage level and the second voltage level.

The control circuitry may be configured to increment or decrement a power output of the communication circuitry iteratively between the first occasion and the second occasion.

Sequential first transitions may be used to sequentially communicate first information to the another apparatus.

The communication circuitry may be configured to drive, on a third occasion, a second transition of the first electrical parameter on the electrical interface to the another apparatus. The determination circuitry may be configured to determine further feedback information dependent upon a further measured electrical parameter on the electrical interface. The control circuitry may be configured to use the determined further feedback information to control the power output of the communication circuitry to achieve, on the fourth occasion subsequent to the third occasion, the second transition of the first electrical parameter on the electrical interface within a threshold time period.

The first transition may involve increasing current and the second transition may involve decreasing current. An electronic device may comprise the apparatus.

According to various, but not necessarily all, embodiments of the invention there is provided a method, comprising: driving, on a first occasion, a first transition of a first electrical parameter on an electrical interface to another apparatus; determining feedback information dependent upon a measured electrical parameter on the electrical interface; and controlling, using control circuitry, a power output using the determined feedback information to achieve, on a second occasion subsequent to the first occasion, the first transition of the first electrical parameter on the electrical interface within a threshold time period.

According to various, but not necessarily all, embodiments of the invention there is provided a computer program comprising instructions which, when executed by a processor, enable: driving, on a first occasion, a first transition of a first electrical parameter on an electrical interface to another apparatus; and controlling, using control circuitry, a power output by using feedback information dependent upon a measured electrical parameter on the electrical interface to achieve, on a second occasion subsequent to the first occasion, the first transition of the first electrical parameter on the electrical interface within a threshold time period.

According to various, but not necessarily all, embodiments of the invention there is provided an apparatus, comprising: communication means for driving, on a first occasion, a first transition of a first electrical parameter on an electrical interface to another apparatus; means for determining feedback information dependent upon a measured electrical parameter on the electrical interface; and means for using the determined feedback information to control the power output of the communication means to achieve, on a second occasion subsequent to the first occasion, the first transition of the first electrical parameter on the electrical interface within a threshold time period.

BRIEF DESCRIPTION OF THE DRAWINGS

For a better understanding of various examples of embodiments of the present invention reference will now be made by way of example only to the accompanying drawings in which:

FIG. 3B illustrates two sequential pulses on an electrical interface;

FIG. 3C illustrates four sequential pulses on an electrical interface;

DETAILED DESCRIPTION OF VARIOUS EMBODIMENTS OF THE INVENTION

Figure 1:
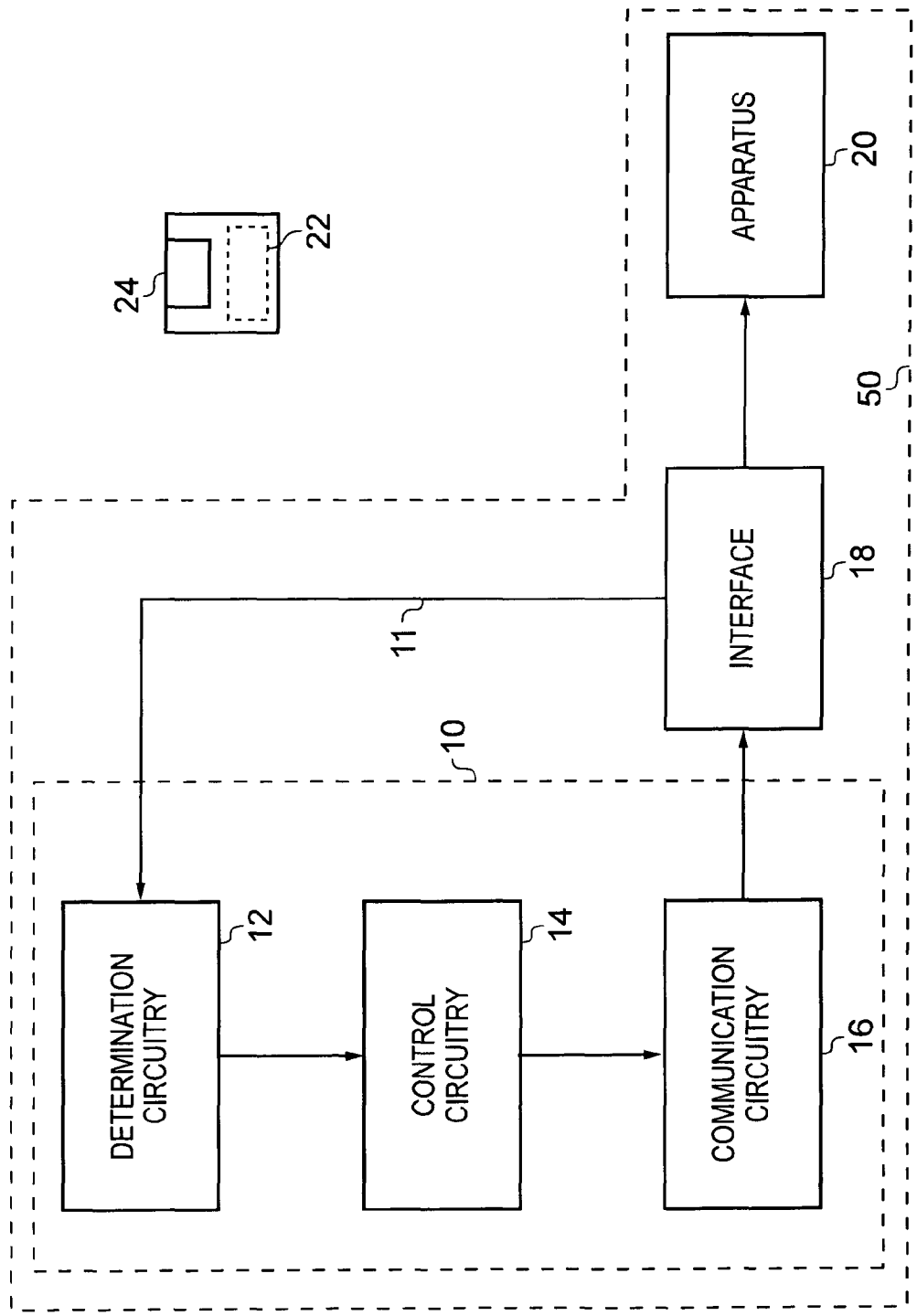
FIG. 1 illustrates an electronic device.

The Figures illustrate an apparatus 10, comprising communication circuitry 16 configured to drive, on a first occasion, a first transition of a first electrical parameter on an electrical interface 18 to another apparatus 20; determination circuitry 12 configured to determine feedback information dependent upon a measured electrical parameter on the electrical interface 18; and control circuitry 14 configured to use the determined feedback information to control the power output of the communication circuitry 16 to achieve, on a second occasion subsequent to the first occasion, the first transition of the first electrical parameter on the electrical interface within a threshold time period.

FIG. 1 illustrates an example of an electronic device 50. The illustrated electronic device 50 comprises a first apparatus 10, an electrical interface 18 and a second apparatus 20. The electronic device 50 may, for example, be a hand portable electronic device such as a mobile telephone, a personal digital assistant or a personal music player.

The electronic device 50 illustrated in FIG. 1 comprises a housing that houses the first apparatus 10, the electrical interface 18 and the second apparatus 20. However, in alternative implementations of the invention, at least part of the electrical interface 18 and/or the second apparatus 20 may be situated outside the housing of the electronic device 50.

The electrical interface 18 may be any type of electrical interface. For example, it may comprise only a single electrical line or, alternatively, it may comprise a plurality of electrical lines. It may be a serial interface or a parallel interface. The electrical interface 18 may, for example, be implemented using a printed wiring board (PWB) or a cable. The interface 18 may be, for example, a memory interface, a Universal Serial Bus (USB), an IEEE 1394 interface, an I$^2$C interface, a Secure Digital (SD) interface, a MultiMediaCard (MMC) interface or another type of interface.

The second apparatus 20 could have one or more of a variety of different functions. For example, in some implementations of the invention, the second apparatus is a memory device, such as an internal memory device or a user removable memory device. In other implementations, the second apparatus is an audio playback module, a wireless module such as a wireless receiver module, for example a Frequency Modulation (FM) radio module, or a Global Positioning System (GPS) module, or a wireless transceiver module, for example, a Bluetooth module, or a Wireless Local Area Network (WLAN) module or another type of module.

The first apparatus 10 comprises determination circuitry 12, control circuitry 14 and communication circuitry 16.

The communication circuitry 16 is configured to drive current or voltage transitions on the electrical interface 18, in order to communicate information to the second apparatus 20. The information may, for example, be a clock signal, a control signal or data.

In some embodiments of the invention, the communication circuitry 16 generates the information that it communicates on the electrical interface 16. For example, in this regard, the communication circuitry 16 may comprise a crystal oscillator that is used to drive periodic current or voltage transitions on the electrical interface 18.

In alternative embodiments of the invention, the information is generated by circuitry that is external to the communication circuitry 16. In these embodiments, the communication circuitry 16 receives the information from the external circuitry and drives current or voltage transitions on the electrical interface 18 in order to communicate the received information on the electrical interface 18. In this regard, the communication circuitry 16 may, for example, comprise an amplifier.

The determination circuitry 12 is configured to monitor the current or voltage of the electrical interface using a feedback signal 11. The determination circuitry 12 may monitor the current or voltage of one or more electrical lines of the electrical interface 18. The feedback signal 11 indicates to the determination circuitry 12 when a particular voltage has been reached on the electrical interface 18.

The determination circuitry 12 is configured to use feedback signal 11 to determine feedback information. For example, the feedback signal 11 may indicate to the determination circuitry 12 when a first current level $I_1$ or a first voltage level $V_1$ has been reached on the electrical interface 18, and when a second current level $I_2$ or a second voltage level $V_2$ has been reached on the electrical interface 18. The feedback information may, for example, be a time period between the first current/voltage level being reached on the electrical interface 18 and the second current/voltage level being reached on the electrical interface 18.

The control circuitry 14 is configured to use the determined feedback information to control the power output of the communication circuitry 16.

The first apparatus 10 may be implemented in a number of different ways. For example, the first apparatus 10 may comprise one or more application specific circuits (ASICs), field-programmable gate arrays (FPGAs), signal processing devices or other devices. For example, the ASIC(s) and/or FPGA(s) may be used to implement a state machine. Alternatively, the first apparatus 10 may be implemented using one or more software programmable processors.

FIG. 1 illustrates a computer-readable storage medium 24 that stores a computer program 22 which may control the operation of the first apparatus 10. The computer-readable storage medium 24 may, for example, be an article of manufacture that tangibly embodies the computer program 22 such as a memory device or a record medium such as a CD-ROM or DVD.

The computer program comprises instructions which, when executed by a processor, enable: driving, on a first occasion, a first transition of a first electrical parameter on an electrical interface 18; and controlling, using control circuitry 18, power output by using feedback information dependent upon a measured electrical parameter on the electrical interface 18 to achieve, on a second occasion subsequent to the first occasion, the first transition of the first electrical parameter on the electrical interface within a threshold time period.

The computer program instructions may control the operation of the first apparatus 10, when loaded into a processor. The computer program instructions may therefore provide the logic and routines that enable the first apparatus 10 to perform the method illustrated in FIG. 2. A processor, by reading a memory, is able to load and execute the computer program instructions.

FIG. 1 illustrates the operational coupling of blocks 12, 14, 16, 18 and 20. It should be appreciated that any number or combination of intervening elements can exist (including no intervening elements).

A method will now be described with regard to FIGS. 2, 3A and 3B. At block 100 of FIG. 2, the communication circuitry 16 drives a transition of a first electrical parameter on the electrical interface 18, in order to communicate information to the second apparatus 20. The first electrical parameter may, for example, be current or voltage. The transition may involve increasing or decreasing the amount of current/voltage on the electrical interface 18.

The second apparatus 20 is configured to read the information by detecting current or voltage levels on the electrical interface 18. The speed of the electrical interface 18 depends upon the rate at which current or voltage transitions on the electrical interface 18 can be made by the communication circuitry 16. The speed of the electrical interface 18 may also depend on requirements made in one or more standards.

The combination of the electrical interface 18 and the second apparatus 20 may be observed to have capacitance. The observed capacitance may vary, depending upon the physical characteristics of the second apparatus 20. For example, if the second apparatus 20 is a memory device, the capacity of the memory device may affect the capacitance that is observed. The higher the capacity of the memory device on the electrical interface 18, the higher the capacitance that is likely to be present.

The observed capacitance is also likely to be affected by the number of apparatuses that are connected to the electrical interface. The more apparatuses that are connected, the higher the observed capacitance is likely to be.

The length of the electrical interface 18 may also affect the observed capacitance. For example, if the electrical interface 18 is a cable (such as a USB or IEEE 1394 cable), the length of the cable may affect the observed capacitance. The longer the electrical interface 18 is, the higher the observed capacitance is likely to be.

The presence of the capacitance affects the speed that information can be communicated on the electrical interface 18. For example, when current is driven on the electrical interface 18, a charging effect occurs which slows down the rate of current/voltage increase on the electrical interface 18.

Figure 3A:
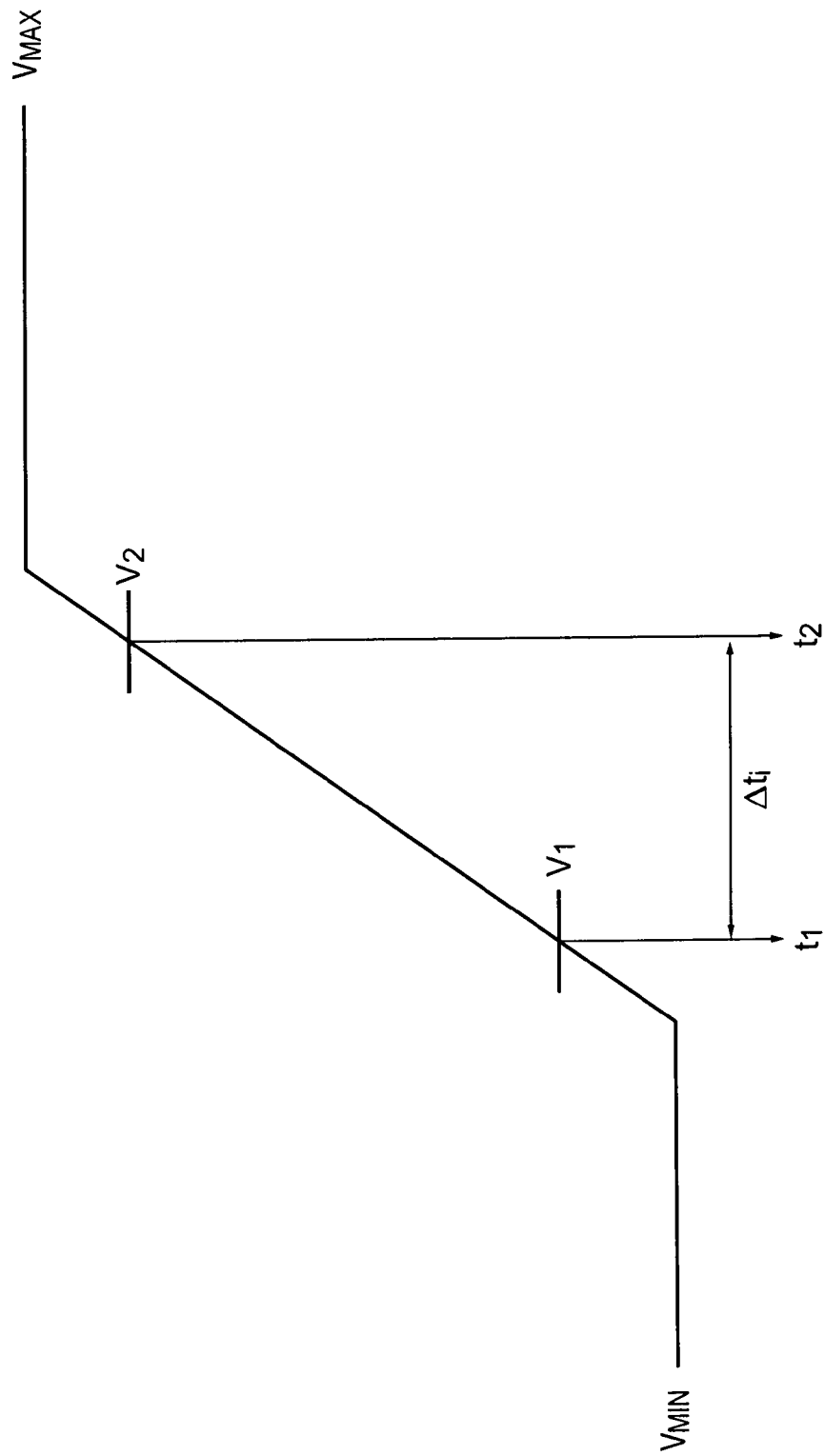
FIG. 3A illustrates a change in voltage on an electrical interface.

FIG. 3A schematically illustrates how the voltage on the electrical interface 18 changes when a default current is driven on the electrical interface 18. Once an increase in current is effected by the communication circuitry 16, the voltage on the electrical interface 18 increases from a minimum voltage level ($V_{min}$) to a maximum voltage level ($V_{max}$).

The voltage on the electrical interface 18, assuming a pure capacitance, is governed by the equation:

$$V = V_{max}(1 - e^{-t/RC}) \quad (1)$$

where: V is the voltage on the electrical interface 18, $V_{max}$ is the maximum voltage on the electrical interface 18, t is time, R is the output resistance of the communication circuitry 16 and C is the observed capacitance.

It is possible to approximate equation (1) as $$V \approx \frac{V_{max} t}{RC},$$

as illustrated in FIG. 3A.

Figure 2:
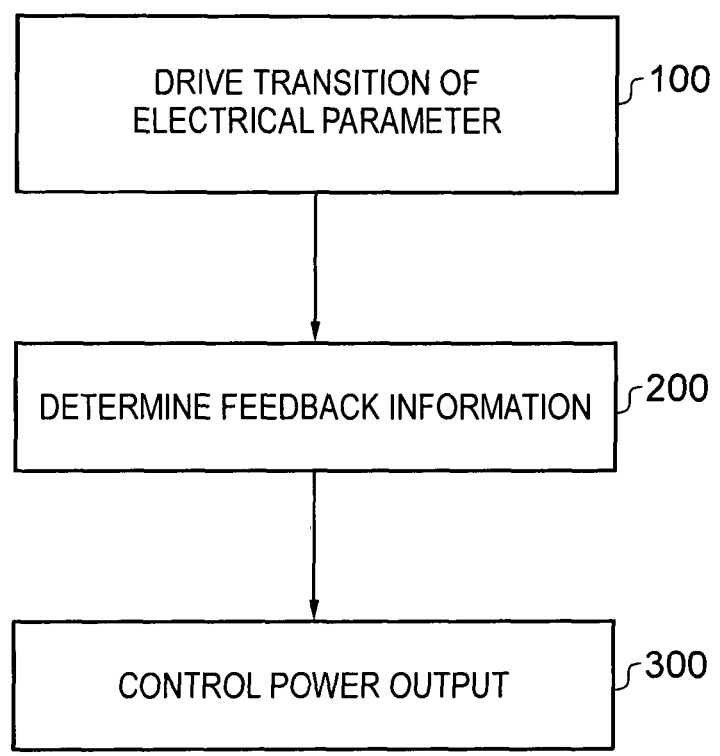
FIG. 2 illustrates a method.

At block 200 of FIG. 2, the determination circuitry 12 determines feedback information using the feedback signal 11. That is, the determination circuitry 12 measures an electrical parameter on the electrical interface 18 and determines when the electrical parameter reaches a first level and when the electrical parameter reaches a second level. In this example, the determination circuitry 12 monitors a voltage on the electrical interface 18 to determine when a first voltage level $V_1$ has been reached and when a second, higher, voltage level $V_2$ has been reached. In an alternative example, the determination circuitry 12 may monitor a current on the electrical interface 18 to determine when a first current level $I_1$ has been reached and when a second, higher, current level $I_2$ has been reached.

The first and second voltages are intermediate the minimum voltage level ($V_{min}$) and the maximum voltage level ($V_{max}$). The first voltage level $V_1$ may be, for example, 10 to 20% of the maximum voltage level $V_{max}$. The second voltage level $V_2$ may be, for example, 80 to 90% of the maximum voltage level $V_{max}$.

A timer in the determination circuitry 12 determines the time taken for the voltage on the electrical interface 18 to increase from the first voltage level $V_1$ to the second voltage level $V_2$. The determination circuitry 12 then provides feedback information that indicates the determined time period $\Delta t_i$ to the control circuitry 14.

It may desirable to achieve the voltage transition from the first voltage level $V_1$ to the second voltage level $V_2$ in a threshold time period $\Delta t_f$. Alternatively, the desired transition may be specified in terms of current. For example, it may be desirable to achieve a current transition from a first current value $I_1$ to a second current value $I_2$ within a threshold time period $\Delta t_f$, where $I_1$ is the current on the electrical interface when the voltage on the electrical interface 18 is the first voltage level $V_1$ and $I_2$ is the current on the electrical interface 18 when the voltage on the electrical interface is $V_2$.

For instance, a particular standard may dictate that a particular voltage transition or current transition has to be made within the threshold time period $\Delta t_f$ in order to meet the standard.

The control circuitry 14 compares the determined time period $\Delta t_i$ with a threshold time period $\Delta t_f$. At block 300 of FIG. 2, the control circuitry 14 controls the power output of the communication circuitry 16. For example, if the determined time period $\Delta t_i$ is greater than the threshold time period $\Delta t_f$, the control circuitry 14 increases the power output of the communication circuitry 16 so that the next time the communication circuitry 16 drives a voltage/current transition on the electrical interface 18, the voltage/current transition is achieved in the threshold time period $\Delta t_f$.

In more detail, the speed of the voltage transition on the electrical interface 18 from the first voltage level $V_1$ to the second voltage level $V_2$ can be expressed in terms of an "edge speed". The edge speed E is defined as:

$$E = \frac{\Delta V}{\Delta t} \quad (2)$$

where $\Delta V$ is $V_2 - V_1$, and $\Delta t$ is the time taken to increase the voltage of the electrical interface 18 from the first voltage level $V_1$ to the second voltage level $V_2$.

If the change in voltage on the electrical interface 18 is estimated to be a straight line, then:

$$\Delta I = C \times E \quad (3)$$

Where $\Delta I$ is the change in the current that is driven on the electrical interface 18 by the communication circuitry 16 in order to achieve a voltage transition from $V_1$ to $V_2$ on the electrical interface 18, C is the observed capacitance and E is the edge speed.

Assuming that $\Delta V$ remains constant, we can substitute equation (2) into equation (3) and show that:

$$\Delta I_f = \Delta I_i \frac{\Delta t_i}{\Delta t_f} \quad (4)$$

Where $\Delta I_i$ is the default change in drive current by the communication circuitry 16 in order to achieve an initial predetermined voltage transition from $V_1$ to $V_2$, $\Delta t_i$ is the time taken to achieve the initial predetermined voltage transition from $V_1$ to $V_2$, $\Delta t_f$ is the threshold time period in which future voltage transitions from $V_1$ to $V_2$ are to be achieved and $\Delta I_f$ is the current change that is required to be driven by the communication circuitry 16 in order to achieve the voltage transition from $V_1$ to $V_2$ in the threshold time period $\Delta t_f$.

The values for the default drive current change $\Delta I_i$ and the threshold time period $\Delta t_r$ are stored at the control circuitry 14. The value for the determined time period $\Delta t_i$ is known because it was provided to the control circuitry 14 by the determination circuitry 12. The control circuitry 14 may use these values to determine the change in drive current $\Delta I_f$ required to achieve the voltage transition from $V_1$ to $V_2$ in the threshold time period $\Delta t_r$.

Once the required change in drive current $\Delta I_f$ has been determined by the control circuitry 14, the control circuitry 14 controls the power output of the communication circuitry 16 so that the next time the communication circuitry 16 drives a voltage/current transition on the electrical interface 18, the voltage/current transition is achieved in the threshold time period $\Delta t_r$.

Embodiments of the invention are not only applicable to increasing the power output of the communication circuitry 16. They may also be used to reduce the power output of the communication circuitry 16. If the control circuitry 14 determines that the drive current change $\Delta I_i$ caused a voltage/current transition to occur that was quicker than that which is desired/required, the control circuitry 14 may reduce the power output of the communication circuitry 16, so that $\Delta I_f < \Delta I_i$. This may decrease the power consumption of the first apparatus 10 and the amount of electromagnetic interference that is created when communicating on the electrical interface 18.

Advantageously, embodiments of the invention provide a method of optimizing the power output of communication circuitry 16 so that a current/voltage transition can be made on an electrical interface 18 within a desired/required time period, while minimizing power consumption and electromagnetic interference problems.

In the method described above, the second voltage level $V_2$ was described as being greater than the first voltage level $V_1$, meaning that the change in voltage defines a "rising edge". However, embodiments of the invention are equally applicable when the second voltage level $V_2$ is smaller than the first voltage level $V_1$, defining a "falling edge".

The time taken for a falling edge current/voltage transition to occur on the electrical interface 18 may not be the same as the time taken for a rising edge current/voltage transition on the electrical interface 18, even if the rising edge transition and the falling edge transition occur between the same values. Consequently, the magnitude of the change in power output of the communication circuitry 16 that is required to achieve a rising edge transition in a threshold time period may be different to that required to achieve a falling edge transition in a threshold time period.

Therefore, in some embodiments of the invention, the control circuitry 14 may control the communication circuitry 16 to change the power output for falling edge transitions by a different magnitude to that for rising edge transitions.

In other embodiments of the invention, the control circuitry 14 may determine the magnitude of the change in power output of the communication circuitry 16 that is required to achieve a rising edge transition in a threshold time period and the magnitude of the change in power output of the communication circuitry 16 that is required to achieve a falling edge transition in a threshold time period, and then use the higher magnitude of the two for both the rising and falling edge transitions.

It will be appreciated by those skilled in the art that a more accurate determination of the change in drive current that is required to achieve a current/voltage transition in a threshold time period can be made by using equation (1) rather than by modeling the transition from $V_{min}$ to $V_{max}$ (and vice-versa) as a straight line. However, while this method may be more accurate than that described above, more processing power will be required to implement it.

In some embodiments of the invention, the measured current/voltage transition on the electrical interface 18 is not made specifically for the purpose of determining how to change the power output of the communication circuitry 16. For example, the measured current/voltage transition may be used to communicate information (such a clock signal, a control signal or data) to the second apparatus 20 on the electrical interface 18 while remaining fully in accordance with one or more interface standards.

In other, alternative, embodiments of the invention, the measured current/voltage transition on the electrical interface 18 is made specifically for the purpose of determining how to change the power output of the communication circuitry 16 and is not used to communicate information to the second apparatus 20.

It should be appreciated that the time(s) at which the method described above (and illustrated in FIG. 2) is/are carried out may be different, depending upon how embodiments of the invention are implemented. For example, in some implementations, the method may only be carried out when the electronic device 50 is turned on or when the electrical interface 18 is first used by the first apparatus 10. In other implementations, the method may, for example, be carried out periodically. Alternatively, the method may, for example, be carried out each time an apparatus is connected to (or disconnected from) the first apparatus 10 via the electrical interface 18.

FIG. 3B illustrates a first pulse 302 and a second pulse 305. The first pulse 302 includes a rising edge 301 and a falling edge 303 that were produced prior to the power output of the communication circuitry 16 being changed by the control circuitry 14. The second pulse 305 was produced after the control circuitry 14 had used the feedback information relating to the rising edge 301 of the first pulse 302 and the feedback information relating to the falling edge 303 of the first pulse 302 to control the power output of the communication circuitry 16.

It can be seen from FIG. 3B that a technical effect of embodiments of the invention is that both the rising edge transition 304 from $V_{min}$ to $V_{max}$ and the falling edge transition from $V_{max}$ to $V_{min}$ 306 are quicker for the second pulse 305 than the corresponding transitions in the first pulse 302.

FIG. 3C illustrates four sequential pulses 306, 308, 310, 312 and relates to alternative embodiments of the invention where the power output of the communication circuitry 16 is incremented or decremented in an iterative manner. That is, feedback information may be determined on a number of occasions to iteratively change the power output of the communication circuitry 16.

In the FIG. 3C embodiments of the invention, the control circuitry 14 may not determine the change in drive current $\Delta I_f$ that is required to achieve a voltage/current transition on the electrical interface 18 within a threshold period of time. Instead, in response to receiving feedback information indicating that the time taken to perform a voltage/current transition is greater or smaller than a desired/required time period, the control circuitry 14 controls the communication circuitry 16 to increment or decrement its power output accordingly.

The control circuitry 14 continues to increment or decrement the power output of the communication circuitry 16 until the voltage/current transition is achieved in the required time period.

Figure 4:
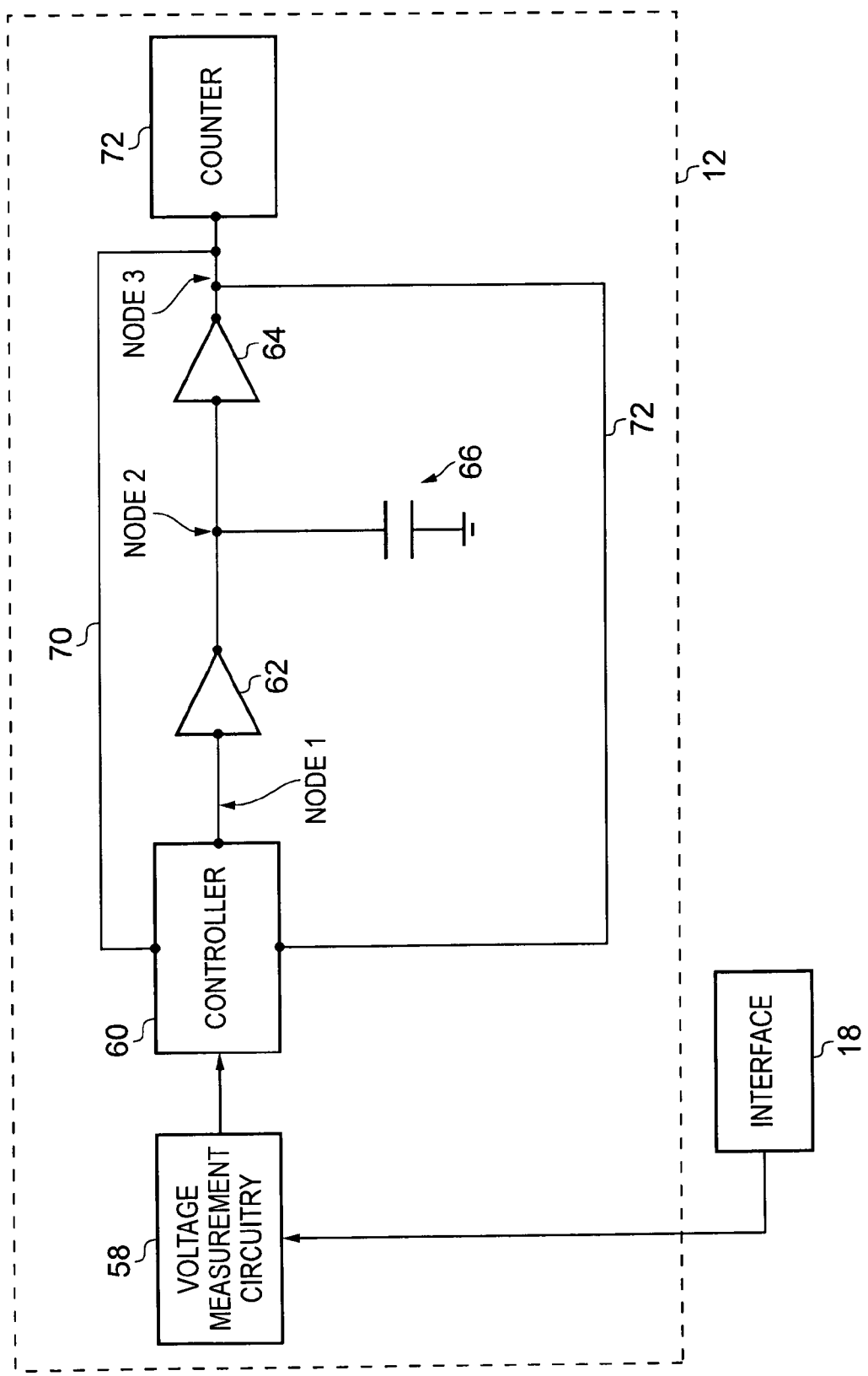
FIG. 4 illustrates an example of determination circuitry.

FIG. 4 illustrates one possible implementation of the determination circuitry 12. In this illustrative example, the determination circuitry 12 comprises voltage measurement circuitry 58, a controller 60, first and second drivers 62, 64, a capacitor 66 and a counter 72. The first and second drivers 62, 64 may, for example, be current drivers or amplifiers.

The voltage measurement circuitry 58 is configured to determine when the first voltage level $V_1$ and the second voltage level $V_2$ are reached on the electrical interface 18. When the voltage level reaches either $V_1$ or $V_2$, the voltage measurement circuitry 58 provides an output to the controller 60.

The controller 60 is configured to provide an output to the first driver 62. The output of the first driver 62 is connected to a capacitor 66 in parallel. The input of the second driver 64 is connected to the capacitor 66 in parallel. The second driver 64 is configured to provide two separate outputs to the controller 60 and an output to the counter 72.

Figure 5:
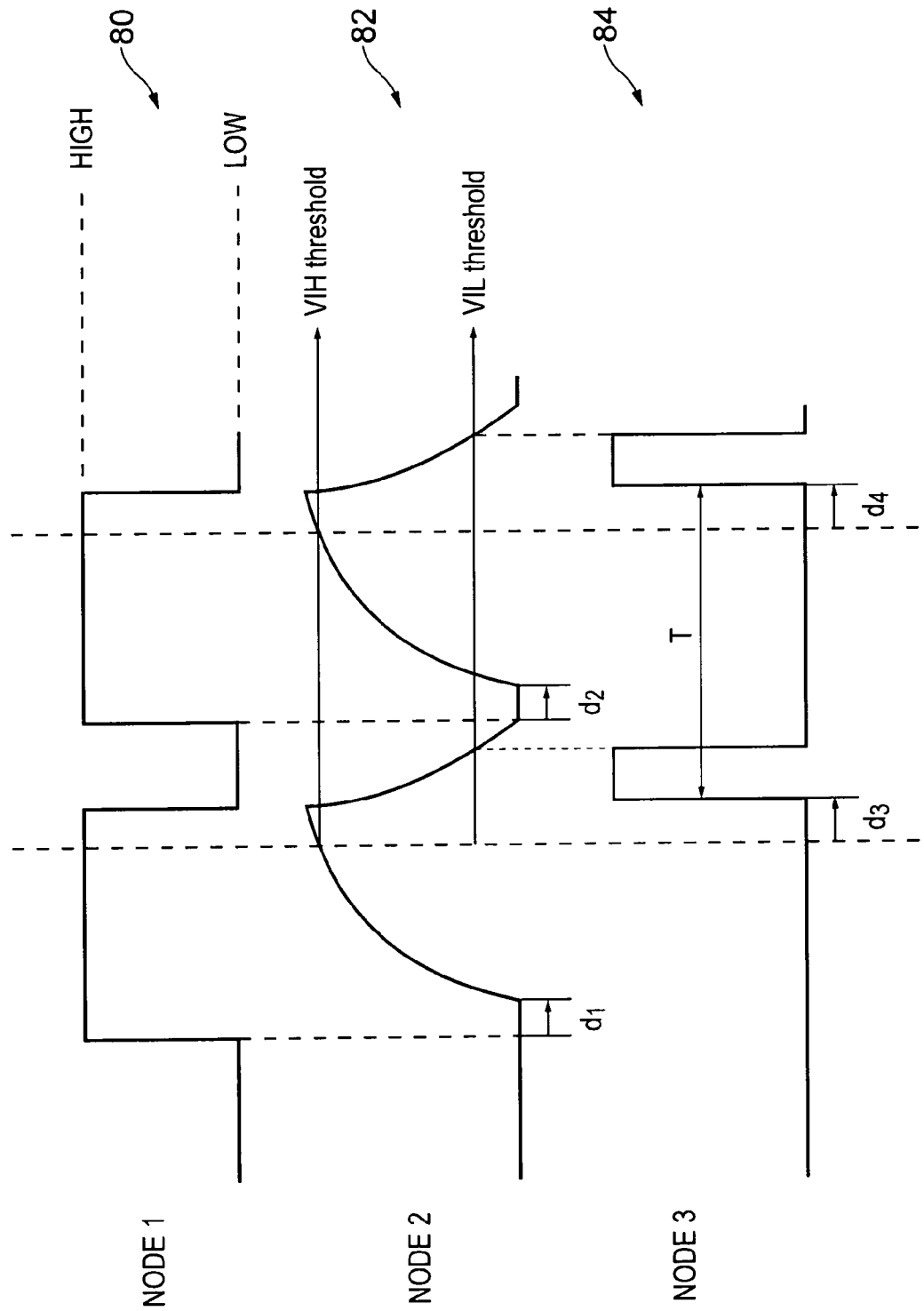
FIG. 5 illustrates voltage-time diagrams for determination circuitry.

FIG. 5 illustrates voltage-time diagrams 80, 82 and 84 for sections of the determination circuitry 12 that are indicated as "node 1", "node 2" and "node 3" in FIG. 4.

The first voltage-time diagram 80 indicates how the voltage at node 1 changes with time. The second voltage-time diagram 82 indicates how the voltage at node 2 changes with time. The third voltage-time diagram 84 indicates how the voltage changes at node 3 changes with time.

The controller 60, the first and the second drivers 62, 64 the capacitor 66 and the counter 72 can collectively be considered to be "oscillation circuitry". The oscillation circuitry generates pulses when the voltage on the electrical interface 18 is between the first voltage level $V_1$ and the second voltage level $V_2$.

In more detail, when the voltage measurement circuitry 58 measures that the voltage on the electrical interface has reached the first voltage level $V_1$, the voltage measurement circuitry 58 provides an output to the controller 60. In response to receiving the output, the controller 60 provides a logic HIGH output to the first driver 62. This logic HIGH signal is illustrated in the first voltage-time diagram 80 in FIG. 5.

In response to receiving the logic HIGH input, the first driver 62 provides an output current that causes the capacitor 66 to charge. There is a small delay between the first driver 62 receiving the logic HIGH signal from the controller 60 and the capacitor 66 beginning to charge. This is represented by "$d_1$" in the second voltage-time diagram 82. As the capacitor charges 66, the voltage at node 2 increases. When the voltage at node 2 reaches a voltage input high (VIH) threshold of the second driver 64, the second driver 64 provides a logic HIGH output. There is a small delay, indicated by "$d_3$" in the third voltage-time diagram 84, between the voltage reaching the VIH threshold and the second driver 64 providing the logic HIGH output.

When the voltage at node 2 reaches a voltage input low (VIL) threshold of the second driver 64, the second driver 64 ceases to provide the logic HIGH output. This results in a pulse being generated which is provided as an output to the counter 72. Reception of the pulse at the counter 72 causes the counter 72 to increment by 1. The generated pulse is also provided to the controller 60, on a first occasion, via a first signal line 70 and on a second occasion via a second signal line 72. When the first pulse on the first signal line 70 is received by the controller 60, the controller 60 ceases to provide the first driver 62 with a logic HIGH output. Consequently, the first driver 62 ceases to provide an output to charge the capacitor 66. The capacitor 66 then discharges via the first driver 62. This is illustrated in the second voltage-time diagram 82 as a drop in the voltage at node 2.

Subsequently, when the second pulse on the second signal line 72 is received by the controller 60, the controller 60 provides a logic HIGH signal to the first driver 62. After a small delay $d_2$, the first driver 62 begins to provide an output to charge the capacitor 66. A subsequent pulse is generated as an output from the second driver 64 through charging and discharging of the capacitor 66. This pulse causes the counter to again increment by one and initiates the process again via the controller 60.

The determination circuitry 12 illustrated in FIG. 4 uses the pulses generated as an output from the second driver 64 to count time. When the voltage of the electrical interface 18 reaches the second voltage level $V_2$, the voltage measurement circuitry 58 provides an output to the controller 60 and the controller 60 acts to prevent pulses oscillating around the oscillation circuit. The time period between the voltage on the electrical interface 18 reaching the first voltage level $V_1$ and the second voltage level $V_2$ is given by value on the counter 72 (i.e. the number of pulses received by the counter 72) multiplied by the time period T between corresponding edges (e.g. leading edges) of two pulses.

The implementation of the determination circuitry 12 illustrated in FIG. 4 advantageously counts time without any need for a crystal oscillator. It will be appreciated by those skilled in the art that the implementation of the determination circuitry 12 that is illustrated in FIG. 4 is only one of many implementations.

The blocks illustrated in FIG. 2 may represent steps in a method and/or sections of code in the computer program 22. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, the electrical interface 18 is described as being used to communicate information from the first apparatus 10 to the second apparatus 20. In practice, the electrical interface 18 may be bi-directional.

The embodiments described above assume that the determination circuitry 12 determines a "transition time" $\Delta t_i$ between two predetermined voltages $V_1$ and $V_2$ and that a new drive current $\Delta I_f$ is determined via equation (4). However, in an alternative embodiment, the determination circuitry 12 may determine a "transition voltage" between an initial predetermined voltage and a variable final voltage within a predetermined time period.

The control circuitry 14 would calculate the new drive current using a ratio of a target voltage transition $\Delta V_1$ with the measured voltage transition $\Delta V_i$. Using equations (2) and (3), it can be shown that:

$$\Delta I_f = \Delta I_i \frac{\Delta V_f}{\Delta V_i} \tag{5}$$

It should also be appreciated that while embodiments of the invention have been described in relation to two apparatuses 10, 20 being connected to the electrical interface 18, in practice many more apparatuses may be connected to the electrical interface 18.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus, comprising:
    communication circuitry configured to communicate information to a further apparatus by driving, on a first occasion, a first transition of an electrical parameter on a wired electrical data communications interface;
    determination circuitry configured to determine feedback information from the first transition of the electrical parameter on the wired electrical data communications interface by measuring the electrical parameter on the wired electrical data communications interface; and
    control circuitry configured to use the determined feedback information to control the power output of the communication circuitry, when a time period of the first transition of the electrical parameter on a wired electrical data communications interface is not within a threshold time period, to achieve, on at least a second occasion, a time period of a second transition of the electrical parameter on the wired electrical data communications interface within the threshold time period, wherein the second occasion is the next time after the first occasion that the communication circuitry drives a transition of the electrical parameter on the wired electrical data communications interface.

2. An apparatus as claimed in claim 1, wherein the electrical parameter is current or voltage.

3. An apparatus as claimed in claim 1, wherein the feedback information is dependent upon a property of the further apparatus.

4. An apparatus as claimed in claim 1, wherein the feedback information relates to a change of a voltage on the wired electrical data communications interface.

5. An apparatus as claimed in claim 4, wherein the change in voltage occurs during the first transition.

6. An apparatus as claimed in claim 4, wherein the change of the voltage is estimated to be linear.

7. A method, comprising:
    using communication circuitry to communicate information from an apparatus to a further apparatus by driving, on a first occasion, a first transition of an electrical parameter on a wired electrical data communications interface;
    determining feedback information from the first transition of the electrical parameter on the wired electrical data communications interface by measuring the electrical parameter on the wired electrical data communications interface; and
    controlling, when a time period of the first transition of the electrical parameter on a wired electrical data communications interface is not within a threshold time period, a power output of the communication circuitry, using control circuitry and the determined feedback information, to achieve, on at least a second occasion, a time period of a second transition of the electrical parameter on the wired electrical data communications interface within the threshold time period, wherein the second occasion is the next time after the first occasion that the communication circuitry drives a transition of the electrical parameter on the wired electrical data communications interface.

8. A non-transitory computer readable medium storing a computer program comprising instructions which, when executed by at least one processor, cause at least the following to be performed:
    using communication circuitry to communicate information from an apparatus to a further apparatus by driving, on a first occasion, a first transition of an electrical parameter on a wired electrical data communications interface; and
    controlling, when a time period of the first transition of the electrical parameter on a wired electrical data communications interface is not within a threshold time period, a power output of the communication circuitry, using control circuitry and feedback information determined from the first transition of the electrical parameter on the wired electrical data communications interface by measuring the electrical parameter on the wired electrical data communications interface, to achieve, on at least a second occasion, a time period of a second transition of the electrical parameter on the wired electrical data communications interface within the threshold time period, wherein the second occasion is the next time after the first occasion that the communication circuitry drives a transition of the electrical parameter on the wired electrical data communications interface.

9. An apparatus as claimed in claim 1, wherein the control circuitry is configured to reduce the power output of the communication circuitry, relative to the first occasion, when performing the second transition.

10. An apparatus as claimed in claim 9, wherein the second transition of the electrical parameter occurs more slowly than the first transition of the electrical parameter.

11. A method as claimed in claim 7, wherein the power output of the communication circuitry is reduced, relative to the first occasion, when performing the second transition.

12. A method as claimed in claim 11, wherein the second transition of the electrical parameter occurs more slowly than the first transition of the electrical parameter.

13. A non-transitory computer readable medium as claimed in claim 8, wherein the power output of the communication circuitry is reduced, relative to the first occasion, when performing the second transition.

14. A non-transitory computer readable medium as claimed in claim 13, wherein the second transition of the electrical parameter occurs more slowly than the first transition of the electrical parameter.

15. An apparatus as claimed in claim 1, wherein the wired electrical data communications interface comprises one or more electrical lines, and the transitions on the first and second occasions are made on at least one of the one or more electrical lines.

16. An apparatus as claimed in claim 1, further comprising a housing configured to house the communication circuitry, the determination circuitry, and the control circuitry.

17. An apparatus as claimed in claim 1, wherein the power output of the apparatus depends on a threshold time period and the time period between a first value of the electrical parameter being reached and [a second value of the electrical parameter being reached.

18. An apparatus as claimed in claim 1, wherein the determined feedback information is a time period between a first value of the electrical parameter being reached and a second value of the electrical parameter being reached.

\* \* \* \* \*